United States Patent [19]
Eckerd et al.

[11] Patent Number: 6,078,498
[45] Date of Patent: Jun. 20, 2000

[54] LOW SWAY SPACE ISOLATION CHASSIS ADAPTER FOR A DISC DRIVE

[75] Inventors: Steve Scott Eckerd, Oklahoma City; Kenneth Lee Pottebaum, Yukon, both of Okla.

[73] Assignee: Seagate Technology, Inc., Scotts Valley, Calif.

[21] Appl. No.: 08/975,871

[22] Filed: Nov. 21, 1997

Related U.S. Application Data

[60] Provisional application No. 60/055,812, Aug. 15, 1997.

[51] Int. Cl.[7] .............................. G06F 1/16; G11B 33/02; H05K 7/14
[52] U.S. Cl. .................. 361/685; 360/97.02; 360/98.01; 248/638; 248/632; 369/75.1
[58] Field of Search .................................... 361/685, 727; 369/75.1–82; 360/97.02, 97.01, 98.01, 137; 248/638, 632

[56] References Cited

U.S. PATENT DOCUMENTS

| | | | |
|---|---|---|---|
| Re. 35,915 | 10/1998 | Hastings et al. | 361/685 |
| 4,713,714 | 12/1987 | Gatti et al. | 360/137 |
| 5,214,549 | 5/1993 | Baker et al. | 360/97.01 |
| 5,235,482 | 8/1993 | Schmitz | 360/97.02 |
| 5,400,196 | 3/1995 | Moser et al. | 360/97.02 |
| 5,726,864 | 3/1998 | Copeland et al. | 361/685 |
| 5,767,445 | 6/1998 | Wu | 361/727 |
| 5,777,821 | 7/1998 | Pottebaum | 360/97.02 |
| 5,837,934 | 11/1998 | Valavanis et al. | 361/685 |

*Primary Examiner*—Leo P. Picard
*Assistant Examiner*—Lisa Lea-Edmonds
*Attorney, Agent, or Firm*—Crowe & Dunlevy

[57] ABSTRACT

A low sway space isolation chassis adapter is disclosed to facilitate the mounting of a disc drive in a mounting environment, the disc drive having a base deck to which a printed circuit board is affixed. A mounting plate is secured to mounting features of the base deck so that the printed circuit board is disposed between the mounting plate and the base deck. The mounting plate includes a central web to which a damping layer is affixed. A chassis plate is disposed between the mounting plate and the printed circuit board, the chassis plate having a central web which is affixed to the damping layer and mounting flanges facilitating the mounting of the disc drive. The damping layer and the central webs of the chassis plate and mounting plate form a laminate which provides constraint layer damping for the disc drive.

16 Claims, 5 Drawing Sheets

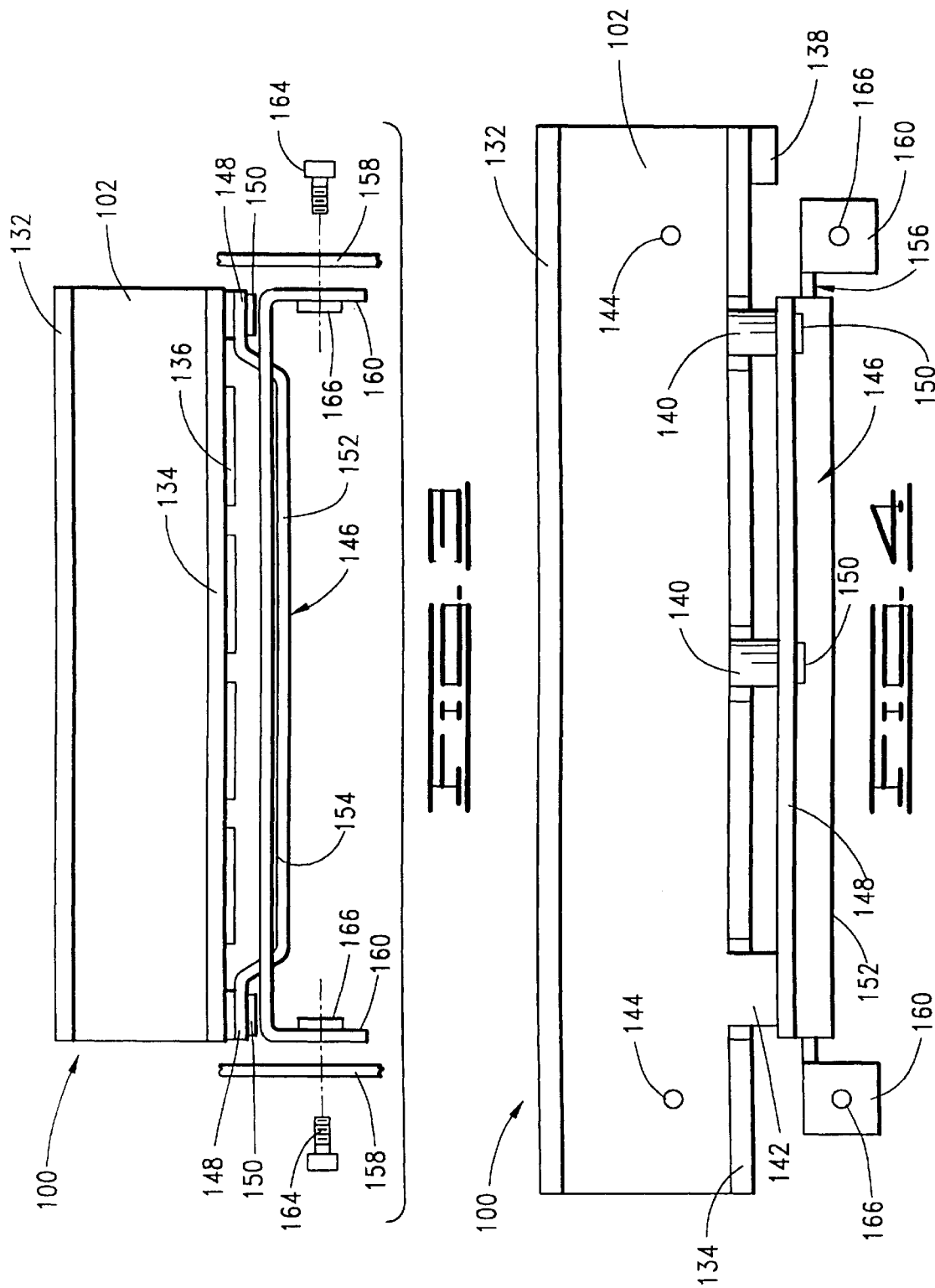

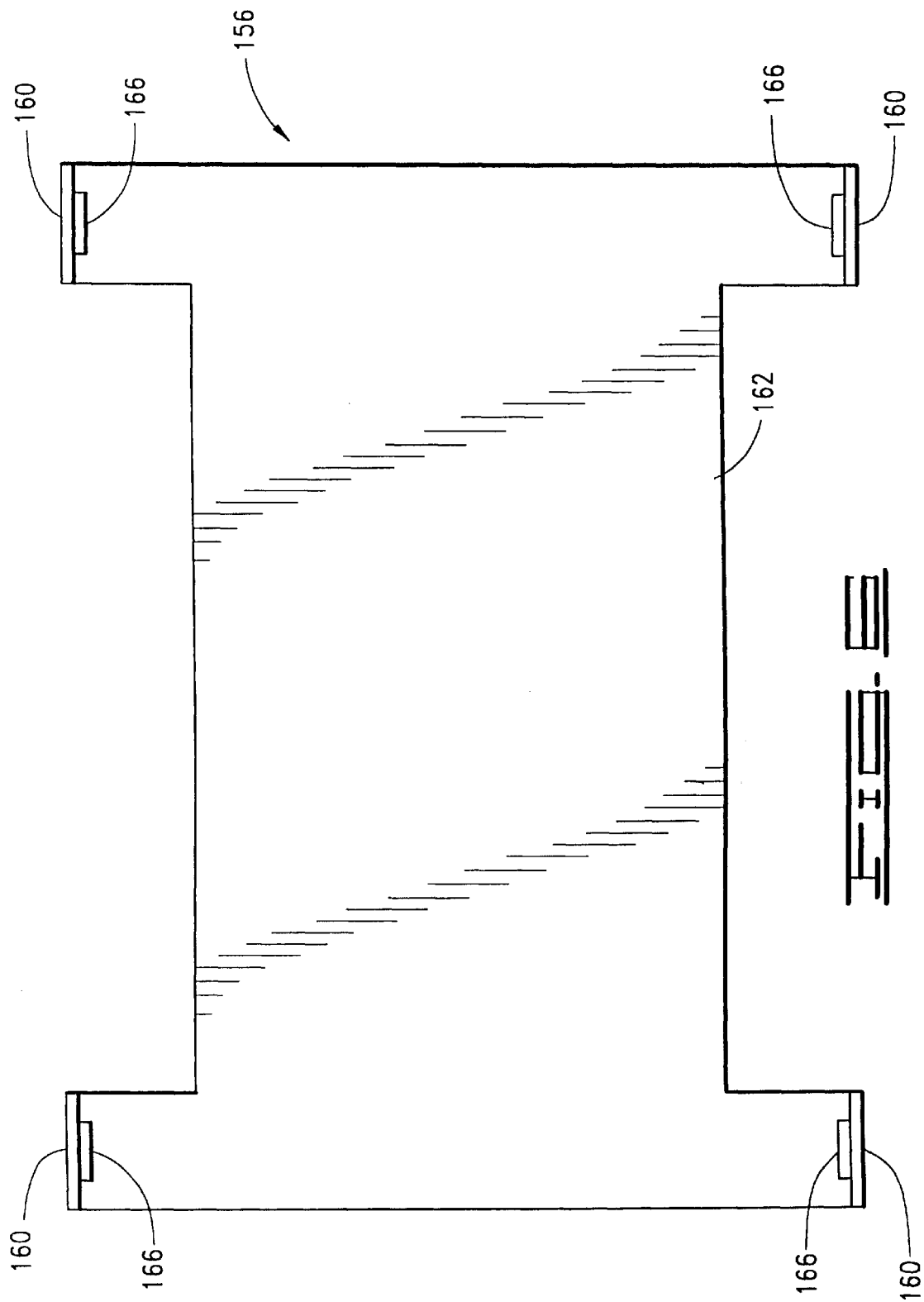

LOW SWAY SPACE ISOLATION CHASSIS ADAPTER FOR A DISC DRIVE

RELATED APPLICATIONS

This application claims the benefit of Provisional Application No. 60/055,812 entitled LOW SWAY SPACE ISOLATION CHASSIS ADAPTER FOR DRIVES, filed Aug. 15, 1997.

FIELD OF THE INVENTION

This invention relates generally to the field of disc drive storage devices, and more particularly, but not by way of limitation, to improving the operational performance of a disc drive through the use of a low sway space disc drive chassis adapter.

BACKGROUND OF THE INVENTION

Disc drives are commonly used in workstations, personal computers, portables and other types of computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extends generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of an associated disc as the disc rotates.

Each head is mounted to a flexure/gimbal assembly which in turn extends from a rotary actuator arm so as to be selectively positionable over a preselected data track of the disc to either read data from or write data to the preselected data track. The head includes a slider assembly having an air bearing surface that causes the head to fly over the data tracks of the disc surface on an air bearing established by air currents set up by the rotation of the disc.

Typically, several discs are stacked on top of each other and the surfaces of the stacked discs are accessed by the heads mounted on a complementary stack of actuator arms which compose an actuator assembly. The actuator assembly generally includes head wires which conduct electrical signals from the heads to a flex circuit, which in turn conducts the electrical signals to a printed circuit board (PCB) mounted to a disc drive base deck.

A continuing trend in the disc drive industry is to increase the data storage capacities in successive generations of drives while maintaining or reducing the physical sizes of the drives. As a result, interdisc spacings and areal densities are continually increasing, providing increased sensitivity to external vibration inputs, self-excitation of rigid body vibration modes and warpage when the drives are mounted in a fixture or system.

Previous generations of disc drives typically utilized vibration isolation devices such as shock mounts (grommets) within the disc drive mounting envelope to isolate the drives from such effects, as disclosed for example in U.S. Pat. No. 5,140,478 issued Aug. 18, 1992 to Yoshida. As will be recognized, these devices provide vibration isolation for selected frequencies and additionally protect disc drive base decks from warpage.

However, associated problems with such devices include the degradation of mechanical shock resistance and the requirement for significant amounts of sway space (that is, the space allocated to allow movement of a disc drive housing in the event of a mechanical shock to the drive). As understood by those skilled in the art, the sway space requirement significantly affects the design of a drive because the disc drive space envelope includes not only the physical space occupied by the drive, but also the associated sway space of the drive. Thus, both the physical size of the drive as well as the associated sway space must fit within the available space for the drive in a given mounting environment (such as, for example, within a disc drive bay in a personal computer).

Accordingly, the general trend in the industry is to move away from the use of such isolation devices in favor of no external isolation protection beyond the basic structure of the disc drive housing. While such an approach has generally been found to provide stiffer drive mounting, thereby increasing mechanical shock resistance and facilitating greater track densities, there remains a risk that high frequency vibrations caused by the rotation of the discs may excite resonances in the mounting environment sufficient to generate undesirable acoustic noise and adversely affect servo operation of the drive.

Accordingly, as disc drive data storage and transfer requirements continue to increase, there remains a continual need for advancements in the art whereby disc drives can be provided with sufficient mechanical shock resistance and mounting environment isolation to meet low sway space requirements and to facilitate reliable operation of the drives.

SUMMARY OF THE INVENTION

The present invention comprises an apparatus for mechanically isolating a disc drive in a mounting environment. In accordance with a preferred embodiment, the disc drive includes a base deck and a printed circuit board.

An isolation chassis adapter is provided having a mounting plate which is secured to mounting features of the base deck so that the printed circuit board is disposed between the mounting plate and the base deck. The mounting plate includes a central web to which a damping layer is affixed, the damping layer preferably comprising a thin layer of double sided pressure sensitive adhesive.

A chassis plate is disposed between the mounting plate and the printed circuit board, the chassis plate having a central web which is affixed to the damping layer and mounting flanges which facilitate the mounting of the disc drive. The damping layer and the central webs of the chassis plate and mounting plate form a laminate providing constraint layer damping and mechanically isolating the chassis plate from both the base deck and the mounting plate.

These and various other features as well as advantages which characterize the present invention will be apparent from a reading of the following detailed description and a review of the associated drawings.

BRIEF DESCRIPTION OF THE DRAWINGS

FIG. 3 is an end elevational view of the isolation chassis adapter assembled in conjunction with the disc drive.

FIG. 4 is a side elevational view of the isolation chassis adapter assembled in conjunction with the disc drive.

FIG. 6 is a bottom plan view of a chassis plate of the isolation chassis adapter, as viewed from the bottom side of the disc drive.

DETAILED DESCRIPTION

Figure 1:
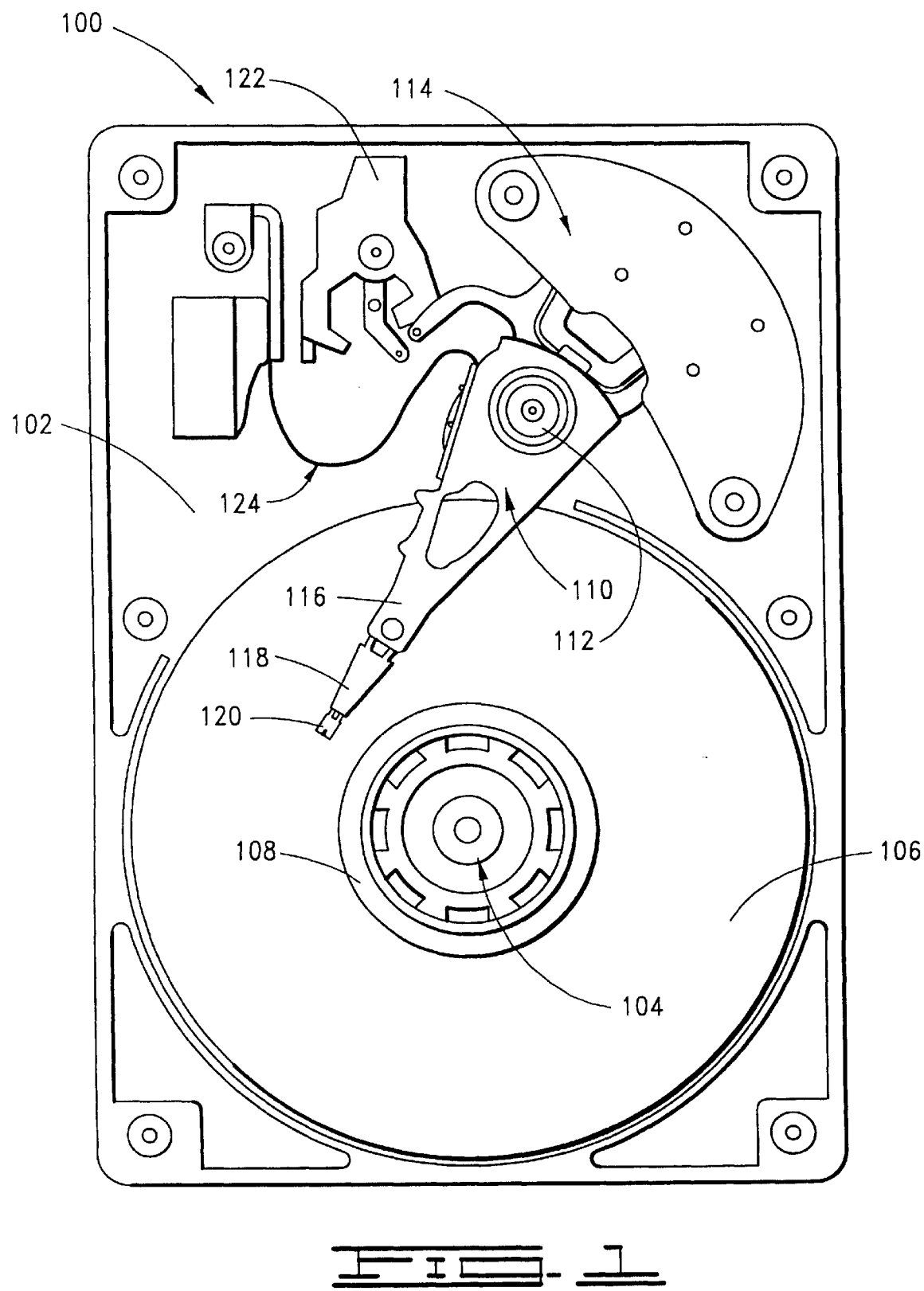
FIG. 1 is a top plan view of a disc drive constructed in accordance with a preferred embodiment of the present invention.

Turning now to the drawings and more particularly to FIG. 1, shown therein is a top plan view of a disc drive 100 constructed in accordance with a preferred embodiment of the present invention. The disc drive 100 includes a base deck 102 to which various components of the disc drive 100 are mounted. A top cover, which has been omitted from FIG. 1 to facilitate the present discussion, cooperates with the base deck 102 to form an internal, sealed environment for the disc drive.

A spindle motor 104 is provided to rotate a stack of discs 106 at a constant high speed. A disc clamp 108 secures the discs 106 to a hub (not separately designated) of the spindle motor 104.

To transfer data to and from the discs 106, a controllably positionable actuator assembly 110 is provided which rotates about a cartridge bearing assembly 112 in response to currents applied to a coil (not separately designated) of a voice coil motor (VCM) 114. The actuator assembly 110 includes a plurality of arms 116 from which corresponding flexure assemblies 118 extend. Heads 120 are provided at distal ends of the flexure assemblies 118 and are supported over the discs 106 by air bearings established by air currents set up by the rotation of the discs 106. A latch assembly 122 is provided to secure the heads 120 over landing zones at the innermost diameters of the discs 106 when the disc drive 100 is deactivated. A flex circuit assembly 124 provides electrical communication paths between the actuator assembly 110 and a disc drive printed circuit board (not shown in FIG. 1) mounted to the underside of the disc drive 100 in a conventional manner.

Figure 2:
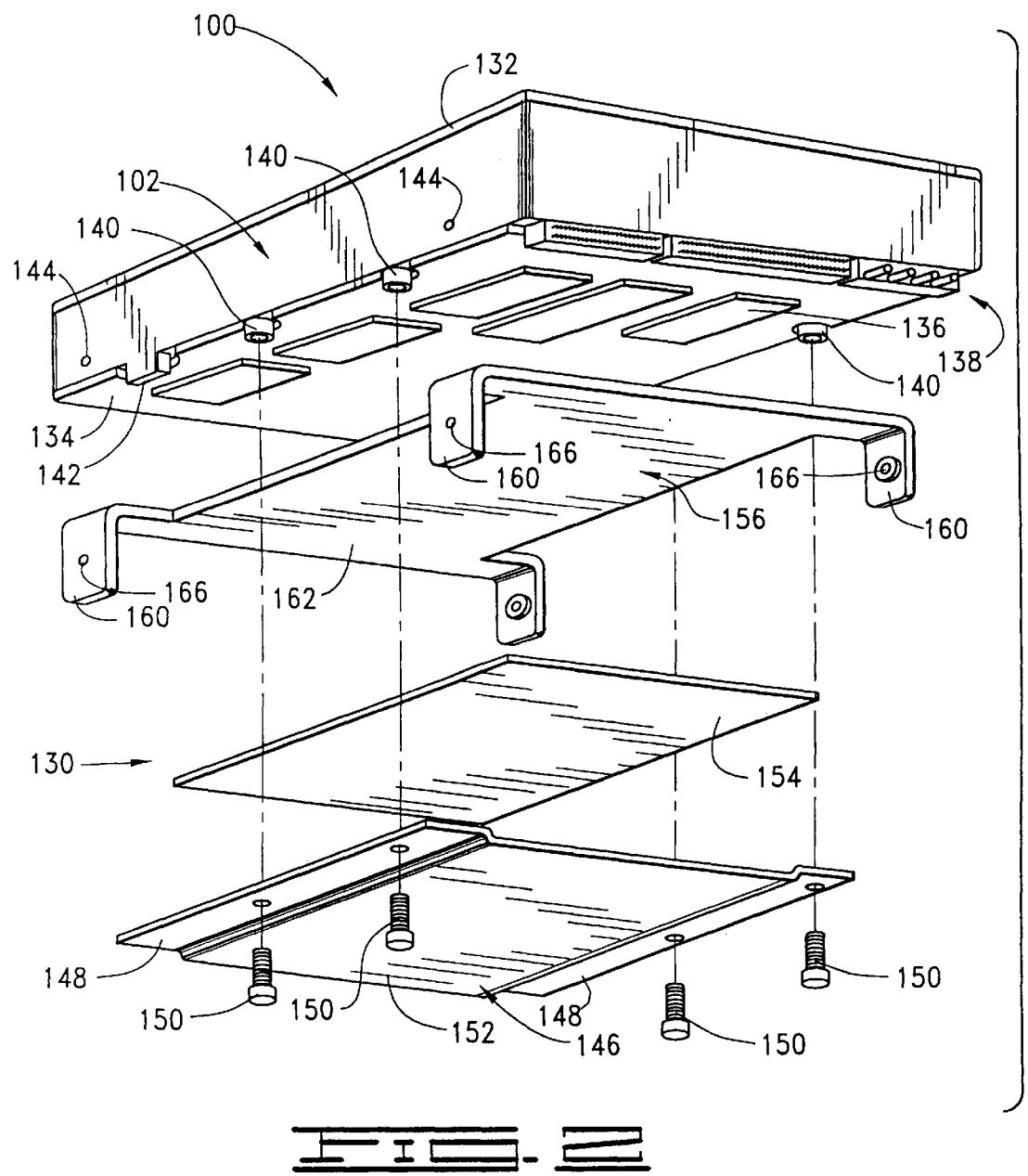
FIG. 2 is an isometric, exploded view of an isolation chassis adapter for isolating the disc drive relative to a mounting environment.

Referring now to FIG. 2, shown therein is a isometric, exploded view of the disc drive 100 of FIG. 1 in conjunction with an isolation chassis adapter 130 which is used to isolate the disc drive 100 when the drive is mounted in a mounting environment (such as a disc drive bay in a personal computer). Before discussing the isolation chassis adapter 130 in detail, however, it will first be noted that the disc drive 100 is shown in FIG. 2 to include a top cover 132 as well as the previously mentioned disc drive printed circuit board (PCB), which is designated by reference numeral 134.

The PCB 134 includes a plurality of conventional circuit devices (one of which is identified at 136) which control the operation of the disc drive 100. Connectors 138 allow electrical connections to be established between the disc drive 100 and the mounting environment using conventional cabling (not shown). The PCB 134 is notched as shown around a number of conventional base deck mounting features, such as internally threaded bosses 140 and standoff tabs 142 (only one of which is visible in FIG. 2). The bosses 140 and tabs 142 extend beyond the height of the circuit devices 136 and the connectors 138 to define a mounting plane upon which the disc drive 100 can rest. Threaded mounting holes 144 also extend into the sides of the base deck 102, as shown. Hence, the disc drive 100 can be directly mounted in the mounting environment through the selective application of appropriate hardware to the bosses 140 or to the holes 144, as desired, and such an approach is typically utilized in the prior art.

However, improved disc drive mounting isolation is achieved through use of the isolation chassis adapter 130 ("adapter"), to which attention is now directed. As shown in FIG. 2, as well as in FIGS. 3 and 4 which show assembled end and side views, respectively, of the adapter 130 in conjunction with the disc drive 100, the adapter 130 comprises a generally u-shaped mounting plate 146 which is rigidly affixed to the base deck 102 of the disc drive 100.

Figure 5:
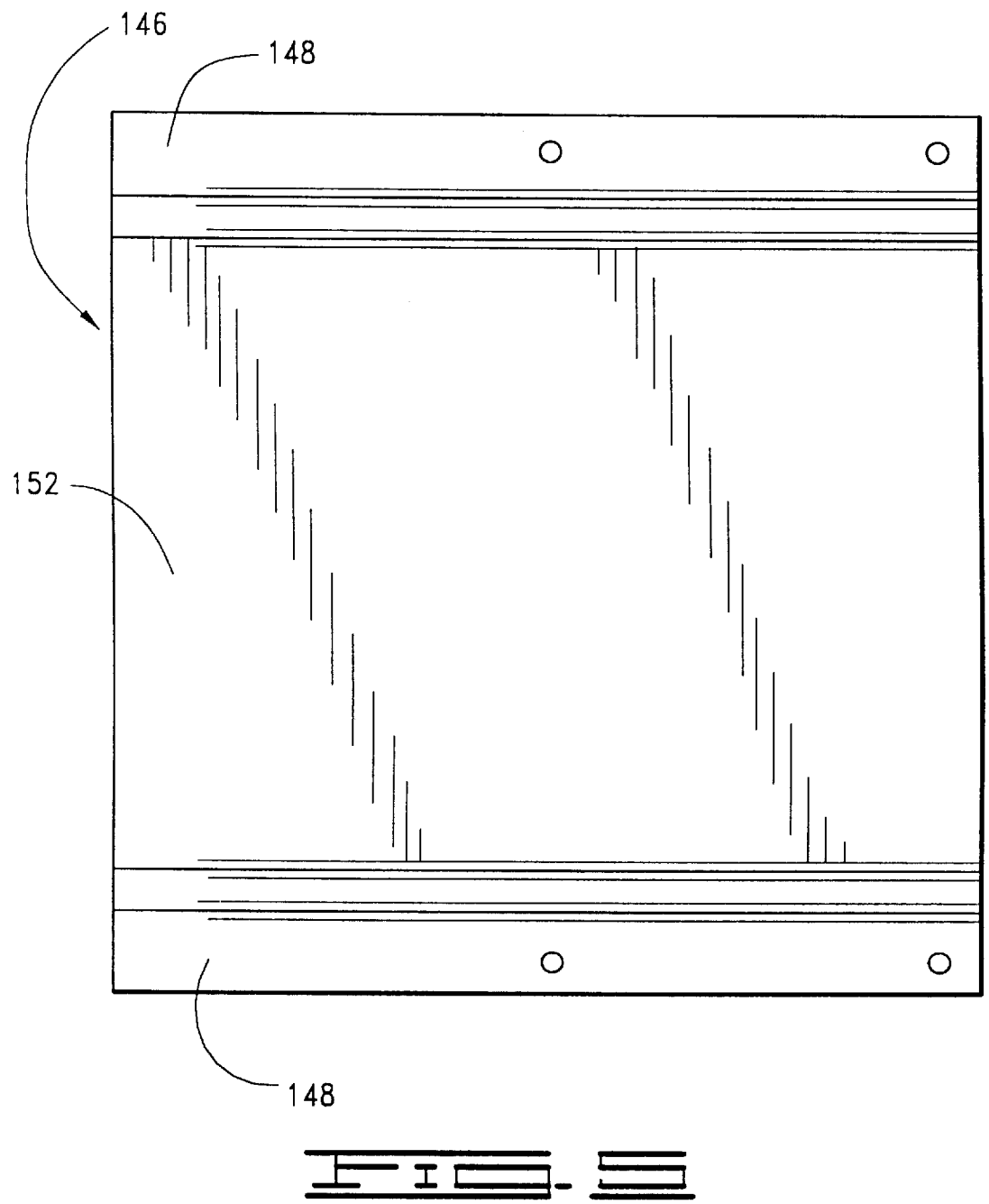
FIG. 5 is a bottom plan view of a mounting plate of the isolation chassis adapter, as viewed from the bottom side of the disc drive.

More particularly, the mounting plate 146 includes a pair of base flanges 148 which are oriented along a first plane (not separately designated in the drawings) to enable the mounting plate 146 to be secured against the bosses 140 and tabs 142 of the base deck 102 by way of fasteners 150, which engage the bosses 140 as shown. A central web 152 of the mounting plate 146 is formed between the two base flanges 148 in a second plane (not separately designated) which is parallel to the first plane and disposed at an elevation lower than the first plane, as referenced with respect to the bottom of the disc drive 100. The mounting plate 146 is preferably formed from sheet metal, which can be readily fabricated into the illustrated configuration. A bottom, plan view of the mounting plate 146 (as viewed from the bottom side of the disc drive 100) is shown in FIG. 5.

A damping layer 154 is affixed to the central web 152, as shown in FIGS. 2 and 3. The damping layer is preferably formed from a suitable thermoplastic or visco-elastic material of about 0.76 millimeters (0.03 inches) in thickness sandwiched between two layers of pressure sensitive adhesive (PSA) each of about 0.13 millimeters (0.005 inches) in thickness, so that the damping layer 154 is provided with double-sided PSA. A suitable damping layer material is part no. EARC-1002-03-PSA commercially available from EAR Specialty Composite Corporation, Indianapolis, Ind. The damping layer 154 is preferably coextensive with the central web 152, although other configurations for the damping layer 154 are contemplated, such as a series of parallel strips.

The adapter 130 is further shown to include a chassis plate 156 which is disposed between the mounting plate 146 and the disc drive 100. The chassis plate 156 is used to mount the disc drive 100 relative to the mounting environment (side wall portions of which are represented in exploded fashion at 158 in FIG. 3). More particularly, the chassis plate 156 includes mounting flanges 160 which extend from a central web 162, so that hardware (such as 164 in FIG. 3) can be passed through threaded holes 166 in the mounting flanges to mount the disc drive 100. The threaded holes 166 are located so as to be vertically aligned with the holes 144 in the sides of the base deck 102. The chassis plate 156 is preferably formed from sheet metal and appropriately sized extruded holes are incorporated to provide the threads for the holes 166 (press in or welded nuts can be alternatively used). The chassis plate 156 can also be molded from plastic or metal, as desired.

The central web 162 of the chassis plate 156 is affixed to the top adhesive layer of the damping layer 154, as shown more clearly in FIG. 3. The chassis plate 156 is positively retained relative to the mounting plate 146, but does not contact either the mounting plate 146 or the disc drive 100.

Accordingly, the disc drive 100 is mounted to the mounting environment by way of the chassis plate 156 and constraint layer damping of the disc drive 100 is achieved by a laminate formed by the damping layer 154 and the rigid central webs 152, 162 of the mounting and chassis plates 146, 156, respectively.

The adapter 130 provides additional strength to the base deck 102 and facilitates greater resistance to warpage of the base deck 102. Additionally, the adapter 130 operates to isolate the disc drive 100 from the effects of internal and external vibrations as well as suppress the generation of acoustic noise by the disc drive 100 during operation. Finally, the adapter 130 enables the disc drive 100 to possess a low sway space requirement.

It will be recognized that the relative configurations of the mounting plate 146 and the chassis plate 156 can vary, depending upon the requirements of a given application. However, as hardware mounting locations are typically standardized, it is contemplated that the adapter 130 can be sized as required to enable a standard sized low profile drive having a disc diameter of approximately 9.50 centimeters (3.74 inches) and a nominal form factor of approximately 14.60 centimeters in length by 10.16 centimeters in width by 2.54 centimeters in height (5.75 inches by 4.00 inches by 1.00 inch) to be mounted in a standard half-height form factor mounting space; that is, in a space having approximate dimensions of 14.60 centimeters by 10.16 centimeters by 4.14 centimeters (5.75 inches by 4.00 inches by 1.63 inches).

Although the double sided PSA of the damping layer 154 has been described in the embodiment presented above as securing the chassis plate 156 relative to the mounting plate 146, other mechanical configurations are contemplated, such as mechanical hardware or rivets, provided that no direct contact between the mounting plate 146 and the chassis plate 156 occurs.

From the foregoing discussion, it will now be recognized that the present invention is directed to a low sway space isolation chassis adapter (such as 130) for isolating a disc drive (such as 100) in a mounting environment (such as 158). The disc drive includes a base deck (such as 102) and a printed circuit board (such as 134).

A mounting plate (such as 146) is secured to mounting features (such as 140, 142) of the base deck so that the printed circuit board is disposed between the mounting plate and the base deck. The mounting plate includes a central web (such as 152) to which a damping layer (such as 154) is affixed.

A chassis plate (such as 156) is disposed between the mounting plate and the printed circuit board, the chassis plate having a central web (such as 162) which is affixed to the damping layer and mounting flanges (such as 160) which facilitate the mounting of the disc drive. The damping layer and the central webs of the chassis plate and mounting plate form a laminate providing constraint layer damping and mechanically isolating the chassis plate from both the base deck and the mounting plate.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus for isolating a disc drive in a mounting environment, the disc drive having a printed circuit board rigidly affixed adjacent a base deck of the disc drive, the apparatus comprising:

a mounting plate rigidly affixable to mounting features of the base deck so that the printed circuit board is disposed between the mounting plate and remaining portions of the base deck, the mounting plate comprising a central web;

a damping layer affixable to the central web of the mounting plate so as to be disposed between the central web and the printed circuit board; and a chassis plate, disposable between the damping layer and the printed circuit board, comprising a central web affixable to the damping layer, the chassis plate facilitating mounting of the disc drive in the mounting environment.

2. The apparatus of claim 1, wherein the mounting plate comprises a pair of base flanges extending from the central web of the mounting plate, the base flanges abuttable with the mounting features of the base deck.

3. The apparatus of claim 2, wherein the base flanges of the mounting plate are aligned along a first plane, the central web of the mounting plate is aligned along a second plane parallel to the first plane, and the first and second planes are parallel to a plane along which the printed circuit board extends.

4. The apparatus of claim 1, wherein the damping layer is substantially coextensive with the central web of the mounting plate and the central web of the chassis plate.

5. The apparatus of claim 1, wherein the chassis plate comprises a plurality of mounting flanges extending from the central web of the chassis plate, the mounting flanges facilitating the mounting of the disc drive in the mounting environment.

6. The apparatus of claim 5, wherein each of the mounting flanges includes a mounting portion normally disposed to the central web of the chassis plate, the mounting portion abuttable with side wall portions of the mounting environment.

7. The apparatus of claim 6, wherein the base deck further comprises side walls substantially parallel to the mounting portions of the chassis plate and mounting holes extending into the side walls of the base deck, and wherein mounting holes provided in the mounting portion substantially align with the mounting holes in the side walls of the base deck.

8. The apparatus of claim 1, wherein the chassis plate, the mounting plate, the dampening layer, and the base deck are configured so as to be mountable in a half height form factor mounting space of nominally 14.60 centimeters by 10.16 centimeters by 4.14 centimeters.

9. A disc drive, comprising:

a base deck;

a printed circuit board affixed adjacent and extending in a direction parallel to the base deck; and an isolation chassis adapter for mounting the disc drive in a mounting environment, comprising:

a mounting plate having base flanges affixed to mounting features of the base deck and a central web between the base flanges, the printed circuit board disposed between the central web and the base deck;

a damping layer affixed to the central web of the mounting plate; and a chassis plate having mounting flanges facilitating mounting of the disc drive in the mounting environment and a central web affixed to the damping layer and disposed between the damping layer and the printed circuit board, the chassis plate, damping layer and mounting layer forming a laminate providing constraint layer damping for the disc drive.

10. The disc drive of claim 9, wherein the base flanges of the mounting plate are aligned along a first plane, the central web of the mounting plate is aligned along a second plane parallel to the first plane, and the first and second planes are parallel to a plane along which the printed circuit board extends.

11. The disc drive of claim 9, wherein the damping layer is substantially coextensive with the central web of the mounting plate and the central web of the chassis plate.

12. The disc drive of claim 9, wherein each of the mounting flanges includes a mounting portion normally disposed to the central web of the chassis plate, the mounting portion abuttable with side wall portions of the mounting environment.

13. The disc drive of claim 12, wherein the base deck further comprises side walls substantially parallel to the mounting portions of the chassis plate and mounting holes extending into the side walls of the base deck, and wherein mounting holes provided in the mounting portion substantially align with the mounting holes in the side walls of the base deck.

14. The disc drive of claim 9, wherein the damping layer comprises a layer of pressure sensitive adhesive.

15. The disc drive of claim 14, wherein the damping layer further comprises a layer of thermoplastic material.

16. The disc drive of claim 8, wherein the chassis plate, the mounting plate, the dampening layer, and the base deck are configured so as to be mountable in a low profile form factor mounting space of nominally 14.60 centimeters by 10.16 centimeters by 2.54 centimeters.

* * * * *